Patented Feb. 4, 1947

2,415,335

UNITED STATES PATENT OFFICE 2,415,335

HIGH MOLECULAR WEIGHT GLYCOLS

Herman A. Bruson, Rydal, and Warren D. Niederhauser, Philadelphia, Pa., assignors to The Resinous Products & Chemical Company, Philadelphia, Pa., a corporation of Delaware No Drawing. Application November 9, 1945, Serial No. 627,777

3 Claims. (Cl. 260—617)

This invention relates to new glycols of high molecular weight which are useful in the preparation of linear polyesters and alkyd resins of both the drying and non-drying types. These glycols are of the general formula:

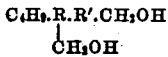

wherein R is a six-membered alicyclic hydrocarbon group and R' is a divalent straight-chained hydrocarbon group of nine carbon atoms.

These glycols are prepared by hydrogenating under controlled conditions the products obtained by reacting by addition an ester of acrylic acid and an ester of elaeostearic acid in the absence of any polymerizing catalyst, as described in our application Serial No. 600,851, filed June 21, 1945. The ester groups of the addition product are reduced with hydrogen at temperatures of 200° to 300° C. in the presence of a copper chromite catalyst under pressures of 70 to 350 atmospheres.

The primary product of hydrogenation is the unsaturated glycol of the formula:

(the C₆H₇ group being a cycloaliphatic group containing one double bond), which may be further hydrogenated, as with a nickel catalyst, to give the saturated glycol:

The saturation of double bonds is desirably accomplished with hydrogen under pressure with a nickel catalyst. Raney nickel is particularly useful and may be used at temperatures of 100°–180° C. at 10 to 100 atmospheres pressure.

The addition products which may be used as starting materials are fully described in our above-identified application. While for the formation of this addition product there may be used any ester of acrylic acid and a monohydric alcohol, such as methyl, ethyl, isopropyl, butyl, octyl, and the like, methyl acrylate is definitely the ester of choice, since the alcohol radical is lost and the methyl radical is of economic advantage. The same considerations hold for the ester of elaeostearic acid. The preferred addition product is, therefore, the addition product of methyl acrylate and methyl elaeostearate.

The invention is illustrated by the following example:

A mixture of 99 parts of the adduct obtained by adding together one mol of methyl acrylate and one mol of methyl elaeostearate and ten parts of copper oxide-chromium oxide (copper chromite) catalyst was hydrogenated in an autoclave at 150–200 atmospheres pressure and at 260° C. for thirty hours. The product was separated from the catalyst by filtration. It was chiefly the unsaturated dihydric alcohol, which has the composition:

Without purification in this case the product was mixed with ten parts of Raney nickel and heated at 135° C. for two and one-half hours under hydrogen at about twenty atmospheres pressure. The resulting product was filtered free from catalyst and treated with four hundred parts of 30% methanolic potassium hydroxide for two and one-half hours. This mixture was then diluted with water. The oil which formed as a layer was washed twice with water, dried under reduced pressure, and distilled. At 2 mm. pressure, a fraction was obtained at 233°–235° C. which corresponded in composition to the saturated glycol,

It had a refractive index, $n_D^{28.1}$, of 1.4804.

We claim:

1. A compound of the formula:

wherein R is a six-membered alicyclic hydrocarbon group and R' is a divalent straight-chained hydrocarbon group of nine carbon atoms.

2. A compound of the formula:

wherein C₆H₇ is a six-membered alicyclic hydrocarbon group and C₉H₁₆ is a straight-chained divalent hydrocarbon group.

3. A compound of the formula:

wherein C₆H₉ is a six-membered alicyclic hydrocarbon group.

HERMAN A. BRUSON.
WARREN D. NIEDERHAUSER.